(12) United States Patent
Rylander et al.

(10) Patent No.: US 6,752,095 B1
(45) Date of Patent: Jun. 22, 2004

(54) SEED METERING SYSTEM FOR USE IN A SEEDING MACHINE

(75) Inventors: David J. Rylander, Victoria, IL (US);
Daniel B. Thiemke, Rock Island, IL (US); Todd E. Vandersnick, Geneseo, IL (US); Jose M. Valdez, Montpeilier, IA (US); Miles R. Keaton, Rock Island, IL (US); Garn Penfold, East Moline, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/339,916

(22) Filed: Jan. 10, 2003

(51) Int. Cl.[7] ............................. A01C 7/00; A01C 9/00
(52) U.S. Cl. ..................................... 111/185; 111/900
(58) Field of Search ..................... 111/170, 177–185, 111/77, 900, 921, 922, 200; 221/211

(56) References Cited

U.S. PATENT DOCUMENTS

| | | | |
|---|---|---|---|
| 2,783,918 A | 3/1957 | Bramblett | 222/177 |
| 2,995,274 A | 8/1961 | Haun et al. | 221/211 |
| 3,347,426 A | 10/1967 | Morrison, Jr. et al. | 222/352 |
| 3,348,504 A | 10/1967 | Fischer | 111/34 |
| 3,387,746 A | 6/1968 | Whipple | 221/211 |
| 3,773,224 A | 11/1973 | Winslow | 222/139 |
| 4,650,090 A | * 3/1987 | Orthey | 221/185 |
| 4,924,786 A | 5/1990 | Keeton | 111/184 |
| 5,027,725 A | 7/1991 | Keeton | 111/184 |
| 5,058,766 A | 10/1991 | Deckler | 221/254 |
| 5,720,233 A | 2/1998 | Lodico et al. | 111/184 |
| 5,738,286 A | * 4/1998 | Nishibori | 241/24.14 |
| 6,173,664 B1 | 1/2001 | Heimbuch | 111/178 |
| 6,247,417 B1 | 6/2001 | Heimbuch | 111/178 |

\* cited by examiner

*Primary Examiner*—Christopher J. Novosad
(74) *Attorney, Agent, or Firm*—Taylor & Aust, P.C.

(57) ABSTRACT

A seeding machine includes at least one seed metering system and at least one seed placement system. Each seed metering system includes a seed disc having a plurality of spaced apart seed cells and a circumferential edge. An edge drive engages the circumferential edge for rotatably driving the seed disc. Each seed placement system is in communication with a corresponding seed metering system.

22 Claims, 4 Drawing Sheets

SEED METERING SYSTEM FOR USE IN A SEEDING MACHINE

FIELD OF THE INVENTION

The present invention relates to agricultural seeding machines, and, more particularly, to seed metering systems used to meter (e.g., singulate) seeds.

BACKGROUND OF THE INVENTION

An agricultural seeding machine such as a row crop planter or grain drill places seeds at a desired depth within a plurality of parallel seed trenches formed in soil. In the case of a row crop planter, a plurality row crop units are typically ground driven using wheels, shafts, sprockets, transfer cases, chains and the like. Each row crop unit has a frame which is moveably coupled with a tool bar. The frame may carry a main seed hopper, herbicide hopper and insecticide hopper. If a granular herbicide and insecticide are used, the metering mechanisms associated with dispensing the granular product into the seed trench are relatively simple. On the other hand, the mechanisms necessary to properly meter the seeds, dispense the seeds at a predetermined rate and place the seeds at predetermined relative locations within the seed trench are relatively complicated.

The mechanisms associated with metering and placing the seeds generally can be divided into a seed metering system and a seed placement system which are in communication with each other. The seed metering system receives the seeds in a bulk manner from the seed hopper carried by the frame. Different types of seed metering systems may be used such as seed plates, finger plates, and seed discs. In the case of a seed disc metering system, a seed disc is formed with a plurality of seed cells spaced about the periphery thereof. Seeds are moved into the seed cells, with one or more seeds in each seed cell depending upon the size and configuration of the seed cell. A vacuum or positive pressure air may be used in conjunction with the seed disc to assist in movement of the seeds into the seed cells. The seeds are metered (e.g., singulated) and discharged at a predetermined rate to the seed placement system.

The seed placement system may be categorized as a gravity drop system or a power drop system. In the case of a gravity drop system, a seed tube has an inlet end which is positioned below the seed metering system. The metered seeds from the seed metering system merely drop into the seed tube and fall via gravitational force from a discharge end thereof into the seed trench.

A seed placement system of the power drop variety generally can be classified as a seed conveyor belt drop, rotary valve drop, chain drop or air drop. These types of seed placement systems provide more consistent placement of the seeds along a predetermined path at a desired spacing. For more details of these types of seed placement systems, as well as agricultural planting in general, reference is hereby made to the technical document entitled "PLANTING FUNDAMENTALS OF MACHINE OPERATION"; Breece, Edward H., PhD, et al.; Deere & Co.; 1981, which is incorporated herein by reference.

With a seed metering system including a seed disc as described above, the seed disc typically includes a concentric drive shaft having a sprocket on the outboard end which is driven via a ground drive or the like. The concentrically positioned driven shaft and sprockets may limit the compactness (i.e., reduction in overall size) of the seed metering system.

What is needed in the art is an agricultural seeding machine including a seed metering system which provides positive driving of a seed disc in a more compact manner.

SUMMARY OF THE INVENTION

The present invention provides a seeding machine having a seed metering system with a seed disc which is driven in an edge driven manner.

The invention comprises, in one form thereof, a seeding machine including at least one seed metering system and at least one seed placement system. Each seed metering system includes a seed disc having a plurality of spaced apart seed cells and a circumferential edge. An edge drive engages the circumferential edge for rotatably driving the seed disc. Each seed placement system is in communication with a corresponding seed metering system.

The invention comprises, in another form thereof, a method of metering seeds with a seeding machine. A seed metering system includes a seed disc having a plurality of spaced apart seed cells and a circumferential edge, and an edge drive engaging the circumferential edge. The seed disc is rotatably driven using the edge drive. The seeds are received within the seed cells.

An advantage of the present invention is that the seed disc is driven in a manner allowing the seed disc to be placed between the discs of the double disk furrow opener in a more compact manner.

Another advantage is that the circumferential edge of the seed disc can be driven in different ways, including a gear drive, a friction drive, and a ratchet drive.

Yet another advantage is that the relative position of the edge drive to the seed disc (e.g., top or rearward positioned) can be varied depending on the application.

DETAILED DESCRIPTION OF THE INVENTION

Figure 1:
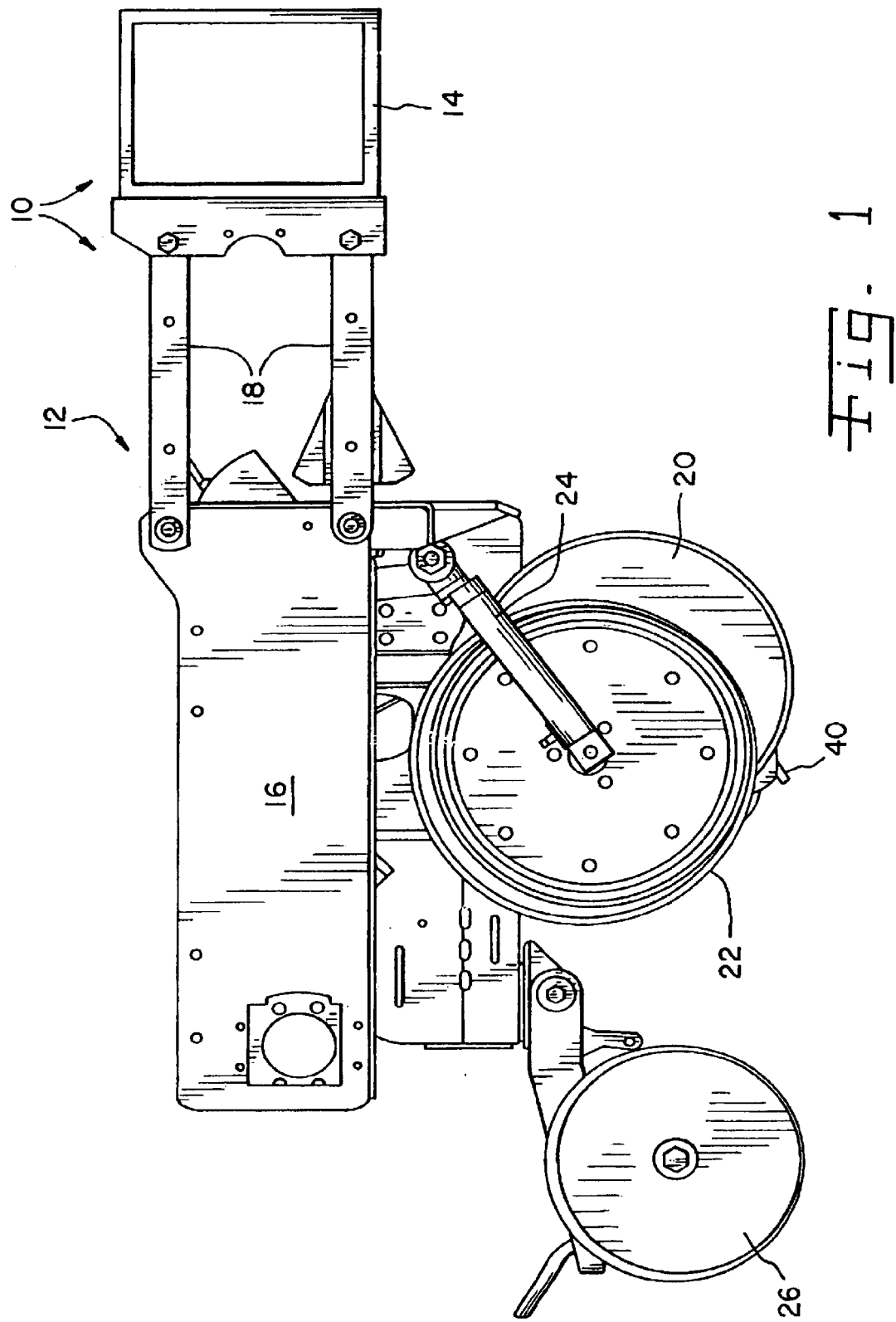
FIG. 1 is a side view of an embodiment of a seeding machine of the present invention including a row crop unit.
Figure 2:
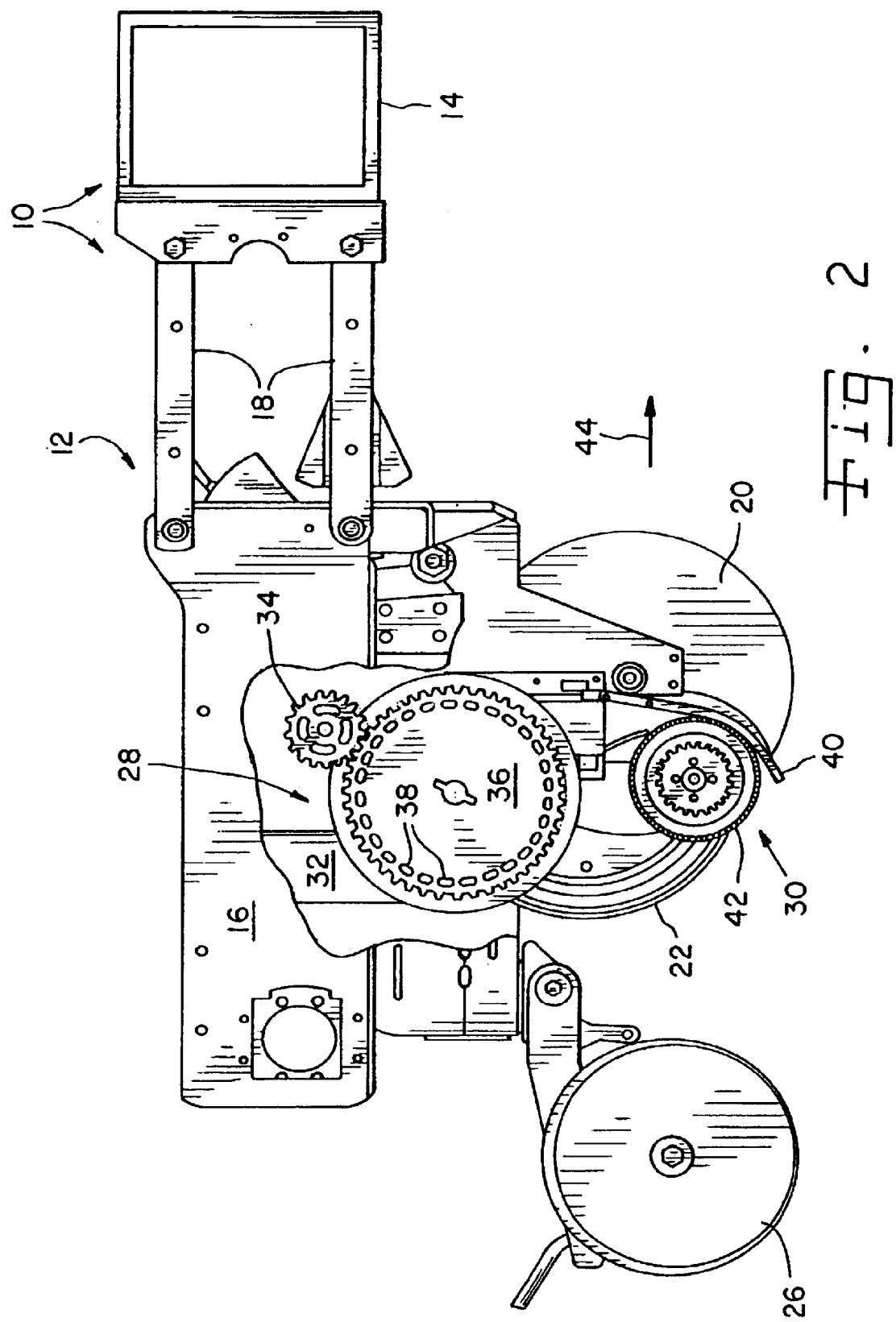
FIG. 2 is a partially fragmentary, side view of the row crop unit shown in FIG. 1, illustrating the internal components of the seed metering system and seed placement system.

Referring now to the drawings, and more particularly to FIGS. 1 and 2, there is shown an embodiment of a seeding machine 10 of the present invention. In the embodiment shown, seeding machine 10 is in the form of a row crop planter but may also be in the form of a grain drill, etc. FIGS. 1 and 2 illustrate a single row crop unit 12 of a multi-row planter, with each row crop unit 12 being substantially identical and connected to a common tool bar 14. Only a single row crop unit 12 is shown for simplicity sake.

Row crop unit 12 includes a multi-part frame 16 which is attached to tool bar 14 by parallel linkage 18. Tool bar 14 is coupled to a traction unit (not shown), such as an agricultural tractor. For example, tool bar 14 may be coupled to an agricultural tractor using a 3-point hitch assembly. Tool bar 14 may be coupled with transport wheel assemblies, marker arms, etc. which may be of conventional design and not shown for simplicity sake. The transport wheels, in known manner, may provide ground drive to row crop unit 12 through the use of shafts, chains, sprockets, transfer cases, etc.

Frame 16 carries a double disc furrow opener 20 for forming a seed trench in soil. A pair of gauge/closing wheels 22 are respectively associated with the pair of discs of double disc furrow opener 20. More particularly, each gauge/closing wheel 22 is positioned generally in line with and immediately adjacent to the outside of each respective disc of double disc furrow opener 20. Gauge/closing wheels 22 are pivotally coupled with frame 16 by respective arms 24. Each gauge/closing wheel 26 may be vertically adjusted to adjust the depth of the trench which is cut into the soil using double disc furrow opener 20.

A pair of closing wheels 26 are also carried by frame 16. Closing wheels 26 are positioned generally in line with double disc furrow opener 20.

Figure 3:
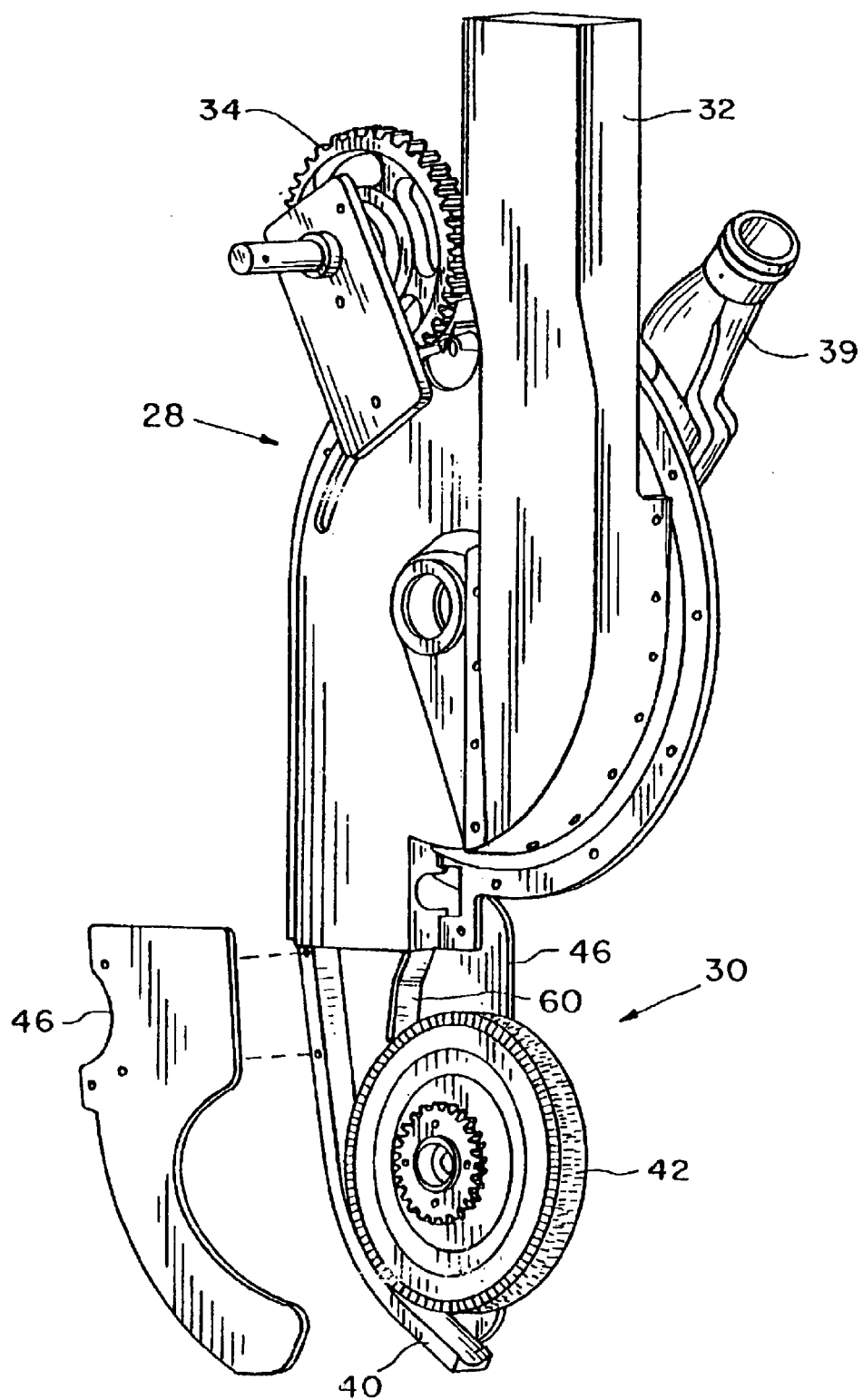
FIG. 3 is a perspective view of the seed metering system and seed placement system shown in FIG. 2, with one of the side plates removed to show the wheel and seed slide.

Referring now to FIGS. 2 and 3, each row crop unit 12 of seeding machine 10 carries a seed metering system 28 and a seed placement system 30. Seed metering system 28 includes an inlet chute 32 which receives seed from a main seed supply, such as a seed hopper carried above frame 16. Alternatively, seed may be stored in a distant main seed hopper and supplied to inlet chute 32 via air or the like.

Seed metering system 28 also includes a drive wheel 34 which drives a seed disc 36 having a plurality of seed cells 38 intermittently spaced about the periphery thereof. A coupler 39 is fluidly coupled with a vacuum source (not shown) for applying vacuum pressure to seed cells 38 formed in seed disc 36. This vacuum pressure promotes entry of the seeds into seed cells 38 and maintains the seeds in place within seed cells 38. Seeds are transported from seed cells 38 to seed placement system 30.

Seed placement system 30 includes a seed slide 40 which directs seed at a predetermined rate into the seed trench formed by double disc furrow opener 20. Seed slide 40 has a width in a direction transverse to the seed trench which is less than the width of the seed trench.

Wheel 42 defining a seed velocity regulator has a circumferential periphery which is positioned at or closely adjacent to seed slide 40 (e.g., 0 to 5 mm, preferably about 1 mm). Wheel 42 engages the seeds received at seed placement system 30 at the predetermined rate and regulates the velocity of the seeds to a speed substantially corresponding to the traveling speed of seeding machine 10 in travel direction 44. Wheel 42 and seed slide 40 co-act to discharge the seeds at a desired trajectory and velocity.

Side plates 46 attach to seed slide 40 and are positioned on either side of wheel 42. Side plates 46 and seed slide 40 together define a housing which partially surrounds wheel 42.

Seed slide 40 is formed with a seed trough 41 which keeps the seed centered on seed slide 40 as it is carried by wheel 42 and also improves the trajectory at which the seed is discharged into the seed trench formed in the soil.

A deflector 60 extends from the bottom of seed metering system 28 towards seed placement system 30. Deflector 60 guides the seeds into the nip formed between wheel 42 and seed slide 40. In the embodiment shown, deflector 60 is in the form of a plate having a width corresponding to the width of wheel 42. However, deflector 60 may be differently configured.

Figure 4:
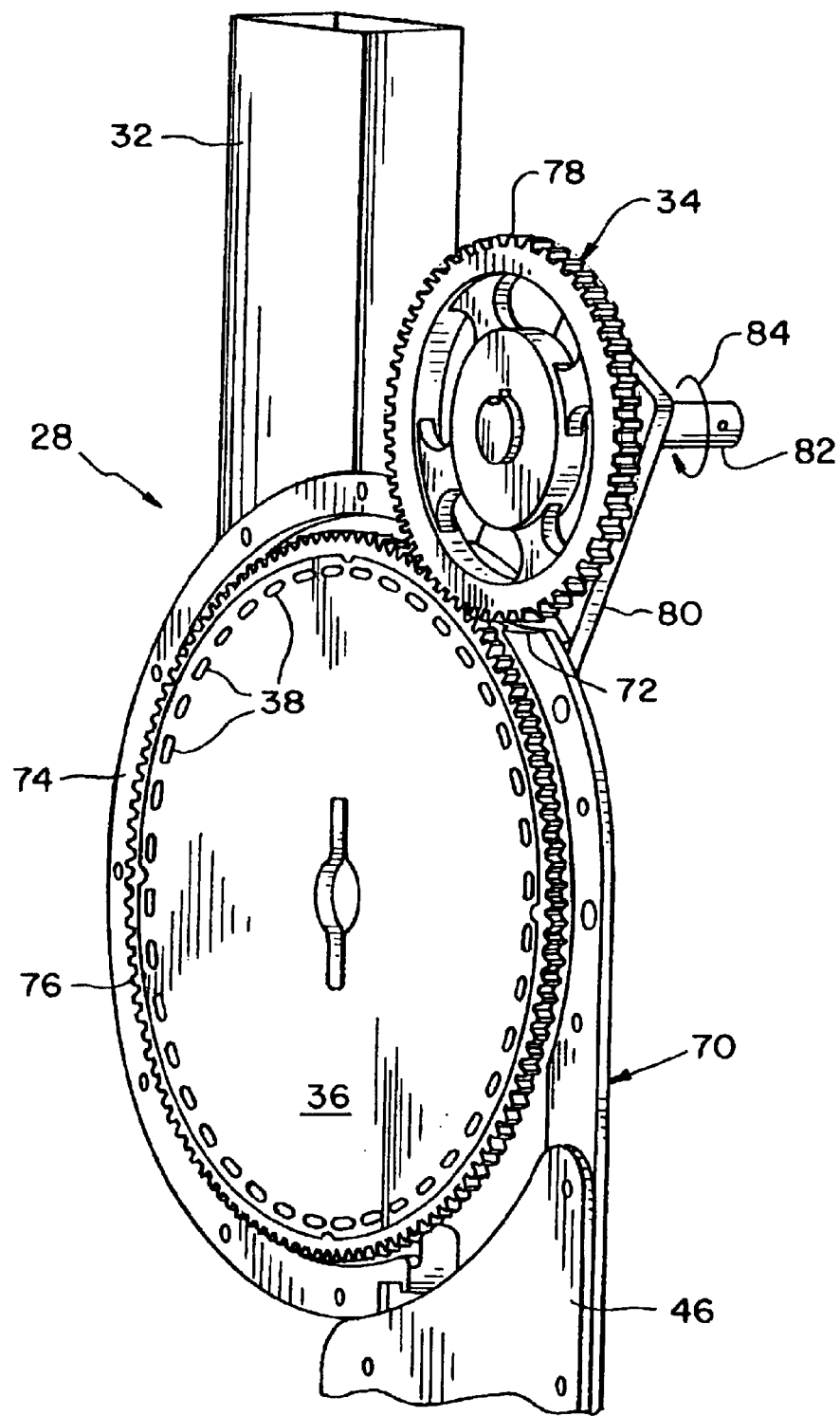
FIG. 4 is a perspective view of the seed metering system shown in FIGS. 2 and 3, with the vacuum dome removed.

Referring now to FIG. 4, seed metering system 28 will be described in further detail. Seed metering system 28 includes a housing 70 defining inlet chute 32. Housing 70 rotatably carries seed disc 36 therein, and includes an opening 72 through which drive wheel 34 extends to engage seed disc 36. Housing 70 includes a vacuum dome (not shown) which mates with flange 74 and defines coupling 39 (FIG. 3) which is attached to a vacuum source.

Seed disc 36 includes a circumferential edge 76 with a plurality of spur gear teeth formed therein. Alternatively, circumferential edge 76 may be formed with bevel gear teeth, a smooth edge, etc.

Drive wheel 34 defines an edge drive which engages circumferential edge 76 of seed disc 36 for rotatably driving seed disc 36. In the embodiment shown, drive wheel 34 is in the form of a gear having a plurality of spur gear teeth 78 at the periphery thereof which enmesh with the spur gear teeth formed in the circumferential edge 76 of seed disc 36. Teeth 78 may also be in the form of bevel gear teeth, etc., depending on the particular application.

A bracket 80 which is attached to or formed integral with housing 70 rotatably carries a drive shaft 82 received within a concentric opening of drive wheel 34. Drive shaft 82 and/or drive wheel 34 may also be positioned at an angle with respect to seed disc 36, depending on the configuration. Drive shaft 82 may be mechanically driven, hydraulically driven, electrically driven, or pneumatically driven depending on the application, as indicated by rotational arrow 84. The speed at which drive shaft 82 is driven as well as the outside diameter of drive wheel 34 may also vary dependent upon desired operating parameters such as a desired seed population, etc.

A conventional seed disc typically has a drive shaft concentrically positioned at the longitudinal axis thereof with an outboard end which extends through the housing of the seed metering system and is driven using an appropriate drive mechanism. As is apparent from the foregoing description, the present invention instead drives the seed disc at the circumferential periphery of the seed disc. This allows the drive wheel to be placed in an area outside the furrow opener so that the seed metering system may be nested within the area between the double discs of the furrow opener. This in turn allows the row crop unit to be reduced in overall size. In the embodiment shown, drive wheel 34 is positioned adjacent to an upper portion of seed disc 36 and extends through a corresponding opening 72 formed in housing 70. It is also possible that drive wheel 34 may be positioned at another location allowing overall reduction in size of the seeding machine by placing drive wheel 34 at another location (e.g., at a rearward portion) relative to seed disc 36.

Moreover, in the embodiment shown, drive wheel 34 rotatably drives seed disc 36 through the use of enmeshing spur gear teeth. However, it is also possible to engage drive wheel 34 with seed disc 36 in a different manner while still driving the circumferential edge of seed disc 36. For example, drive wheel 34 can be formed having a circumferential periphery similar to a V-pulley. A higher friction material such as a rubber insert or the like may be positioned within the V-shaped opening for engaging and driving seed disc 36. Alternatively, drive wheel 34 and seed disc 36 may have rotational axes positioned generally orthogonal to each other and engaged through the use of bevel gear teeth or the like. Other configurations are also possible.

Further, the term "edge drive" as used herein is intended to mean any drive which generally drives seed disc 36 at or near the outer edge thereof. For example, it is also possible to configure seed disc 36 with a rim at the outer edge thereof having a plurality of inwardly facing teeth defining a ring gear. Drive wheel 34 will thus be positioned such that teeth 78 engage the inwardly facing teeth on the ring gear of seed disc 36. Other configurations are also possible.

During use, a selected seed type is received from a main seed supply at inlet chute 32 of seed metering system 28. The seed is maintained against a side of seed disc 36, which is driven by drive wheel 34 at a selected rotational speed using a mechanical drive, hydraulic motor, electric motor or other suitable drive. Seeds are received within seed cells 38 of seed disc 36. To assist seed movement into seed cells 38, a vacuum pressure is applied to the opposite side of seed disc 36 using a suitable vacuum source. Of course, a positive pressure may also be applied to the side of seed disc 36 at which the seeds are disposed. The seeds are discharged from seed metering system 28 to seed placement system 30 at a predetermined rate. Deflector 60 assists in guiding the seed in the nip area formed between wheel 42 and seed slide 40. The gap of approximately one millimeter between the circumferential periphery of wheel 42 and seed slide 40 ensures that the seed is gripped by wheel 42 without applying too much force against the seed. Seed trough 41 maintains the seeds along the longitudinal axis of seed slide 40. The seed is regulated to approximately match the ground speed of the seeding machine and is discharged from seed trough 41 into the seed trench formed in the soil. Gauge/closing wheels 22 and closing wheels 26 close the seed trench and thereby cover the seed in the trench.

Having described the preferred embodiment, it will become apparent that various modifications can be made without departing from the scope of the invention as defined in the accompanying claims.

What is claimed is:

1. A seeding machine, comprising:
at least one seed metering system, each said seed metering system including:
a seed disc having a plurality of spaced apart seed cells and a circumferential edge; and
an edge drive engaging said circumferential edge for rotatably driving said seed disc; and
at least one seed placement system, each said seed placement system being in communication with a corresponding said seed metering system.

2. The seeding machine of claim 1, wherein said seed disc includes a plurality of teeth at said circumferential edge, and said edge drive comprises a gear having a plurality of teeth enmeshing with said seed disc teeth.

3. The seeding machine of claim 2, wherein said seed disc teeth and said edge drive teeth each comprise spur gear teeth.

4. The seeding machine of claim 2, wherein said edge drive includes a drive shaft positioned concentrically with said gear.

5. The seeding machine of claim 4, wherein said drive shaft is one of mechanically driven, hydraulically driven, electrically driven and pneumatically driven.

6. The seeding machine of claim 1, wherein said edge drive comprises one of a gear drive and a friction drive.

7. The seeding machine of claim 1, wherein said edge drive is positioned at an upper portion of said seed disc.

8. The seeding machine of claim 1, wherein each said seed metering system further includes a housing having an opening, said edge drive extending through said opening to engage said circumferential edge of said seed disc.

9. The seeding machine of claim 1, wherein said seeding machine includes a plurality of row crop units, each said row crop unit including one said metering system and one said seed placement system.

10. A seed metering system for use in a seeding machine, comprising:
a seed disc having a plurality of spaced apart seed cells and a circumferential edge; and
an edge drive engaging said circumferential edge for rotatably driving said seed disc.

11. The seed metering system of claim 10, wherein said seed disc includes a plurality of teeth at said circumferential edge, and said edge drive comprises a gear having a plurality of teeth enmeshing with said seed disc teeth.

12. The seed metering system of claim 11, wherein said seed disc teeth and said edge drive teeth each comprise spur gear teeth.

13. The seed metering system of claim 11, wherein said edge drive includes a drive shaft positioned concentrically with said gear.

14. The seed metering system of claim 13, wherein said drive shaft is one of mechanically driven, hydraulically driven, electrically driven and pneumatically driven.

15. The seed metering system of claim 10, wherein said edge drive comprises one of a gear drive, a friction drive, and a ratchet drive.

16. The seed metering system of claim 10, wherein said edge drive is positioned at an upper portion of said seed disc.

17. The seed metering system of claim 10, wherein each said seed metering system further includes a housing having an opening, said edge drive extending through said opening to engage said circumferential edge of said seed disc.

18. A method of metering seeds with a seeding machine, comprising the steps of:
providing a seed metering system including a seed disc having a plurality of spaced apart seed cells and a circumferential edge, and an edge drive engaging said circumferential edge;
rotatably driving said seed disc using said edge drive; and
receiving the seeds within said seed cells.

19. The method of metering seeds of claim 18, wherein said seed disc includes a plurality of teeth at said circumferential edge, and said edge drive comprises a gear having a plurality of teeth enmeshing with said seed disc teeth.

20. The method of metering seeds of claim 19, including the step of driving said sprocket using one of a mechanical drive, hydraulic drive, electrical drive and pneumatic drive.

21. The method of metering seeds of claim 18, wherein said edge drive carries out said rotatably driving step using one of a gear drive and a friction drive.

22. The method of metering seeds of claim 18, including the step of positioning said edge drive at an upper portion of said seed disc.

* * * * *